US012691756B2

(12) United States Patent
Sohn et al.

(10) Patent No.: US 12,691,756 B2
(45) Date of Patent: Jul. 28, 2026

(54) HEAD UP DISPLAY WITH DISPLAYING PLANE DISTANCE CONTROL WITH FREEFORM VARIABLE FOCUSING MICROMIRROR ARRAY LENS SYSTEM

(71) Applicant: SD OPTICS, INC., Seoul (KR)

(72) Inventors: Jin Young Sohn, Seoul (KR); Jong Choon Kim, Seoul (KR); Hong Ju Kim, Seoul (KR); Min Beom Lee, Seoul (KR); Ki Bok Kim, Seoul (KR); Cheong Soo Seo, Seoul (KR)

(73) Assignee: SD Optics, Inc., Seoul (KR)

( * ) Notice: Subject to any disclaimer, the term of this patent is extended or adjusted under 35 U.S.C. 154(b) by 292 days.

(21) Appl. No.: 18/384,721

(22) Filed: Oct. 27, 2023

(65) Prior Publication Data

US 2025/0138303 A1 May 1, 2025

(51) Int. Cl.
| | |
|---|---|
| *B60K 35/23* | (2024.01) |
| *B60K 35/28* | (2024.01) |
| *B60K 35/60* | (2024.01) |
| *G02B 26/08* | (2006.01) |

(52) U.S. Cl.
CPC .......... *B60K 35/23* (2024.01); *G02B 26/0841* (2013.01); *B60K 35/28* (2024.01); *B60K 35/60* (2024.01); *B60K 2360/177* (2024.01); *B60K 2360/785* (2024.01)

(58) Field of Classification Search
CPC ........ G02B 27/01–2027/0198; G02B 26/0841; G02B 26/105; G02B 26/085; G02B 26/0858; G02B 26/0833; G02B 26/101; H04N 5/7491; B81B 3/0083; B81B 3/0086; B81B 2201/04; G03H 2001/043; G03H 2240/25; G03H 2270/21

USPC ........ 359/13–14, 193.1–199.4, 200.6–200.8, 359/221.2, 223.1–225.1, 226.2, 290–295, 359/629–633, 838, 846, 871, 872, 904; 345/7–9; 348/115; 349/11; 250/204, 250/559.06, 559.29, 230, 234; 347/255–260; 353/39, 98–99; 385/15–18, 22; 398/12, 19, 45
See application file for complete search history.

(56) References Cited

U.S. PATENT DOCUMENTS

| | | |
|---|---|---|
| 5,004,319 A | 4/1991 | Smither |
| 5,986,811 A | 11/1999 | Wohlstadter |
| 6,025,951 A | 2/2000 | Swart |
| 6,028,689 A | 2/2000 | Michaliek |
| 6,064,423 A | 5/2000 | Geng |
| 6,084,843 A | 7/2000 | Abe |

(Continued)

FOREIGN PATENT DOCUMENTS

| | | |
|---|---|---|
| JP | 2002-288873 | 10/2002 |

*Primary Examiner* — Jessica M Merlin
(74) *Attorney, Agent, or Firm* — Heedong Chae; Lucem, PC

(57) ABSTRACT

The present invention comprises freeform variable focusing optical component, optical module, focus controller, display unit, display controller and processing unit. With the freeform variable focusing optical component, the augmented reality head up display system of the present invention can overcome limitation on the number of virtual images for various focal length of the system and support visual information to vehicle driver comfortably decreasing the fatigue of eye as reducing the eyes distributed focus change between objects and display.

17 Claims, 10 Drawing Sheets

(56)  References Cited

U.S. PATENT DOCUMENTS

| | | | |
|---|---|---|---|
| 6,111,900 A | 8/2000 | Suzudo | |
| 6,123,985 A | 9/2000 | Robinson | |
| 6,542,696 B2 | 4/2003 | Kindaichi | |
| 6,549,730 B1 | 4/2003 | Hamada | |
| 6,625,342 B2 | 9/2003 | Staple | |
| 6,650,461 B2 | 11/2003 | Atobe | |
| 6,658,208 B2 | 12/2003 | Watanabe | |
| 6,741,384 B1 | 5/2004 | Martin | |
| 6,784,771 B1 | 8/2004 | Fan | |
| 6,833,938 B2 | 12/2004 | Nishioka | |
| 6,885,819 B2 | 4/2005 | Shinohara | |
| 6,900,901 B2 | 5/2005 | Harada | |
| 6,906,848 B2 | 6/2005 | Aubuchon | |
| 6,914,712 B2 | 7/2005 | Kurosawa | |
| 6,919,982 B2 | 7/2005 | Nimura | |
| 6,934,072 B1 | 8/2005 | Kim | |
| 6,985,299 B2 | 1/2006 | Bakin | |
| 6,995,909 B1 | 2/2006 | Hayashi | |
| 7,023,466 B2 | 4/2006 | Favalora | |
| 7,027,207 B2 | 4/2006 | Huiber | |
| 7,031,046 B2 | 4/2006 | Kim | |
| 7,046,447 B2 | 5/2006 | Raber | |
| 7,068,416 B2 | 6/2006 | Gim | |
| 7,077,523 B2 | 7/2006 | Seo | |
| 7,079,325 B2 | 7/2006 | Konno | |
| 7,088,493 B2 | 8/2006 | Alain | |
| 7,164,465 B2 | 1/2007 | Klosner | |
| 7,195,163 B2 | 3/2007 | Yoo | |
| 7,261,417 B2 | 8/2007 | Cho | |
| 7,306,344 B2 | 12/2007 | Abu-Ageel | |
| 7,333,260 B2 | 2/2008 | Cho | |
| 7,370,412 B2 | 5/2008 | Hiraoka | |
| 9,291,819 B2 | 3/2016 | Ferri | |
| 10,055,867 B2 | 8/2018 | Law | |
| 10,591,738 B2 | 3/2020 | Svarichevsky | |
| 10,843,686 B2 | 11/2020 | Mullins | |
| 10,928,901 B2 | 2/2021 | Park | |
| 11,022,738 B2 | 6/2021 | Hong | |
| 11,373,357 B2 | 6/2022 | Mullins | |
| 11,630,303 B2 | 4/2023 | Meijering | |
| 11,686,938 B2 | 6/2023 | Morozov | |
| 2004/0021802 A1 | 2/2004 | Yoshino | |
| 2005/0264870 A1* | 12/2005 | Kim | G02B 7/32 359/298 |
| 2006/0012852 A1* | 1/2006 | Cho | G02B 5/09 359/291 |
| 2013/0241971 A1* | 9/2013 | Sekiya | H04N 9/3129 345/690 |
| 2015/0061976 A1* | 3/2015 | Ferri | G02B 27/0101 345/9 |
| 2015/0331239 A1* | 11/2015 | Ando | G02B 27/01 359/631 |
| 2019/0155028 A1 | 5/2019 | Svarichevsky | |
| 2020/0064640 A1* | 2/2020 | Nagano | B60K 35/00 |
| 2023/0016174 A1 | 1/2023 | Choi | |
| 2023/0032271 A1 | 2/2023 | Christmas | |
| 2023/0090648 A1 | 3/2023 | Christmas | |
| 2023/0091896 A1 | 3/2023 | Smeeton | |
| 2025/0123493 A1* | 4/2025 | Kirillov | G02B 27/0922 |

* cited by examiner

701

702

703

704

701

702

705

703

704

706

707

HEAD UP DISPLAY WITH DISPLAYING PLANE DISTANCE CONTROL WITH FREEFORM VARIABLE FOCUSING MICROMIRROR ARRAY LENS SYSTEM

FIELD OF THE INVENTION

The present invention relates to an AR-HUD (Augmented Reality—Head Up Display) display method based on a freeform variable focusing Micromirror Array Lens System.

BACKGROUND OF THE INVENTION

There are many three-dimensional imaging and display technologies which have been long studied since the twentieth century. Numerous three-dimensional imagining systems and countless three-dimensional display technologies are extensively in use to represent objects in three-dimensional space. In addition, three-dimensional display shows a virtual image such as a Virtual Reality (VR) and an Augmented Reality (AR) which mixed to real image. As multiple objects are shown at the same time, the strain and fatigue given to the user are increased in accordance to the distances where the objects are located.

Since the HUD had been installed on the cars, drivers are able to drive while constantly looking forward and by reducing the numbers of up-and-down eye movements, however change in focal length of the eyes for various distances, as well as near and far distance (1~50 m), remains. While driving, focal length change of the eyes for seeing HUD and the drive sight in turn requires special reaction with a different sense of distance than seeing a fixed screen such as television or theater. The introduction of AR technology plays a role to evolve HUD into AR-HUD. The device superimposes virtual images containing various information on real objects visible to the driver. While driving, the real objects such as various vehicles, walkers, traffic lights, traffic signs and surrounding environment such as road, tree, and buildings appear. In addition, virtual images containing information about these overlap to inform the driver of appropriate information. At this time, the distance of various objects visible to the driver is different, and the focal length changes very quickly depending on the continuous movement of the vehicle. Therefore, HUD has to provide different focal length images at the space in front of the car. Existing HUDs use a method of displaying two separate segments such as near and far segment. For this purpose, virtual images having different distances displayed using translation, rotation, diffraction, and polarization device.

U.S. Pat. No. 9,291,819 B2 to Ferri disclose to creating multiple different Heads-Up Display images at different apparent distances from a viewer using a single picture generator. First and second images generated using respective first and second subsets of modulating elements of an array of image pixel modulating elements of a spatial light modulator. The modulating elements are micromirrors of a Digital Micromirror Device (DMD) and optical elements of the respective optical paths are relatively movable to set relative path lengths.

U.S. Pat. No. 10,591,738 B2 to Svarichevsky disclose a heads up display system with a variable focal plane. The system includes a translation device to dynamically change a position of the imaging matrix relative to the display device based on a predetermined operational parameter to dynamically vary a focal distance between the display device and the at least one image plane.

U.S. Pat. No. 11,022,738 B2 to Hong discloses a head-up display system that includes a display control component, a polarization conversion member, a birefringent lens component, a scattering component, and a reflecting component. It has that the display control component configured to output a first image and a second image alternately to the polarization conversion member that configured to convert light having different polarization states. In an exemplary embodiment, the scattering component includes a polymer dispersed liquid crystal component and a voltage control unit. In this case, the display cycle is less than $\frac{1}{30}$ second.

U.S. Pat. No. 11,630,303 B2 to Meijering shows a system that includes an image realization device for forming a source image and projection optics for rendering a display image on a display screen. The projection optics have an optical axis, and the image realization device includes a first image surface at a first distance along the optical axis and a second image surface at a second, different distance along the optical axis. The first and second image realization surfaces include multiple regions, each region switchable between a transparent state and an image realization state.

U.S. Pat. Pub. No. 2023/0016174 A1 to Choi disclose a head-up display is configured to change display positions of a plurality of virtual images displayed through a windshield of the vehicle or the like to implement augmented reality by a control method. The controller is configured to change an inclination of the first mirror to change a display position of the first and the second virtual image.

U.S. Pat. No. 10,928,901 B2 to Park shows a calibration method for a three-dimensional (3D) augmented reality and an apparatus. The calibration method determines a first conversion parameter representing a relationship of a coordinate system between an eye-tracking camera and a calibration camera by capturing a physical pattern using both the eye-tracking camera and the calibration camera.

U.S. Pat. Pub. No. 2023/0032271 A1 to Christmas discloses an optical system comprising at least one optical element having optical power, which is arranged so that the first and second diffusers have different object distances to the optical system. A spatial light modulator is arranged to display a diffractive pattern of first picture content and/or second picture content. A screen assembly has first and second diffusers arranged in a stepped configuration so that the first diffuser is spatially offset from the second diffuser by a perpendicular distance.

In the previous inventions, methods that control and add to various hardware and calibrate software have been used to display multiple virtual images. However, most of them can only display two to three virtual images, and there is a limit to expanding more than four virtual images and different focus lengths.

To overcome the disadvantages of the previous technologies, the present invention introduces the freeform variable focusing Micromirror Array Lens System. This system can individually control thousands of micromirrors so they can implement an optical surface, and an optical system in a form capable of reflective off-axis incident can be constructed. Therefore, the freeform variable of focusing Micromirror Array Lens System can change variety focus lengths as well as two or three. The freeform variable focusing Micromirror Array Lens System is MEMS-based and has are characteristics of accuracy, repeatability, and fast response speed.

SUMMARY OF THE INVENTION

An objective of the invention is to provide the AR-HUD system that includes an optical module based on the freeform variable focusing Micromirror Array Lens System and is capable of multi-focus to create multiple virtual images. Multiple virtual images provide a focal length for each location and provide users with a clear image, reducing eye fatigue and improving convenience.

The position of virtual images calculated from depths by the sensors. By using the installed sensor on the car or by separately installed sensor for this purpose, the distance data from car to objects can be obtained. The controller of the freeform variable focusing Micromirror Array Lens System operates rapidly to determine the display plane of the virtual images by changing its focal length. Therefore, the virtual image generated by various display units (such as LCD, LED, MicroLED, etc.) is projected to the freeform variable focusing Micromirror Array Lens System through the optical module and provides the information about driving. Because the car moves high speed, the virtual images also constantly varied as the car moves.

As the location of the object changes in real time, the focal length of the virtual image changes rapidly. The freeform variable focusing Micromirror Array Lens System, which is faster and more accurate than traditional HUDs that are simply divided into two or three focal length, provides clear images for real-time changing locations. A suitable display unit and display controller are required to provide this. In this invention, the virtual image generated by an image-processing unit displayed on the display unit using the freeform variable focusing Micromirror Array Lens System with high speed and repeatability, and is displayed according to the driver's gaze through a specially designed optical module.

The present invention pertains to the freeform variable focusing Micromirror Array Lens System, which is to be used to show multiple focal lengths at the same time, making it a suitable factor for HUDs with numerous objects. The scheme, apparatus, and method are disclosed in the present invention.

The subject matter of the present invention of the AR-HUD that utilizes multi focus and rapidity properties of the freeform variable focusing Micromirror Array Lens System. Thanks to multi focus and rapidity of the freeform variable focusing Micromirror Array Lens System, the AR-HUD becomes feasible with multi focus length from one meter to infinity meters. The present invention comprises the freeform variable focusing Micromirror Array Lens, a focus controller for controlling the lens, an optical module, a display unit, a display unit controller, and an image-processing unit.

When the freeform variable focusing Micromirror Array Lens System is used as a variable focus optical element, it can change focal length of the optical system rapidly change focal length of the optics system. The Micromirror Array Lens can generate reliable and repeatable focusing as well as high enough speed for the imaging speed. With the Micromirror Array Lens, the main problem of two-section display of the traditional HUD can be enhanced based on focus varying function of the Micromirror Array Lens.

The general principle and methods for making the Micromirror Array Lens are disclosed in U.S. Pat. No. 6,970,284 issued Nov. 29, 2005 to Kim, U.S. Pat. No. 7,031,046 issued Apr. 18, 2006 to Kim, U.S. Pat. No. 6,934,072 issued Aug. 23, 2005 to Kim, U.S. Pat. No. 6,934,073 issued Aug. 23, 2005 to Kim, U.S. Pat. No. 7,161,729 issued Jan. 9, 2007 to Kim, U.S. Pat. No. 6,999,226 issued Feb. 14, 2006 to Kim, U.S. Pat. No. 7,095,548 issued Aug. 22, 2006 to Cho, U.S. Pat. No. 7,239,438 issued Jul. 3, 2007 to Cho, U.S. Pat. No. 7,267,447 issued Sep. 11, 2007 to Kim, U.S. Pat. No.

7,274,517 issued Sep. 25, 2007 to Cho, and U.S. Pat. No. 7,777,959 issued Aug. 17, 2010 to Sohn, U.S. Pat. No. 7,489,434 issued Feb. 10, 2009 to Cho, U.S. Pat. No. 7,619,807 issued Nov. 17, 2009 to Baek, all of which are incorporated herein by references.

The general principle, structure and methods for making the micromirror array devices and Micromirror Array Lens are disclosed in U.S. Pat. No. 7,382,516 issued Jun. 3, 2008 to Seo, U.S. Pat. No. 7,330,297 issued Feb. 12, 2008 to Noh, U.S. Pat. No. 7,898,144 issued Mar. 1, 2011 to Seo, U.S. Pat. No. 7,474,454 issued Jan. 6, 2009 to Seo, U.S. Pat. No. 7,777,959 issued Aug. 17, 2010 to Sohn, U.S. Pat. No. 7,365,899 issued Apr. 29, 2008 to Gim, U.S. Pat. No. 7,589,884 issued Sep. 15, 2009 to Sohn, U.S. Pat. No. 7,589,885 issued Sep. 15, 2009 to Sohn, U.S. Pat. No. 7,400,437 issued Jul. 15, 2008 to Cho, U.S. Pat. No. 7,488,082 issued Feb. 10, 2009 to Kim, and U.S. Pat. No. 7,535,618 issued May 19, 2009 to Kim, U.S. Pat. No. 7,605,964 issued Oct. 20, 2009 to Gim, U.S. Pat. No. 7,411,718 issued Aug. 12, 2008 to Cho, U.S. Pat. No. 9,505,606 issued Nov. 29, 2016 to Sohn, U.S. Pat. No. 8,622,557 issued Jan. 7, 2014 to Cho, U.S. Pat. Pub. No. 2009/0303569 A1 published Dec. 10, 2009 to Cho, all of which are incorporated herein by references.

In Summary, the AR-HUD of the present invention has the following advantages: (1) AR-HUD can have a variety of focus lengths based on the freeform variable focusing Micromirror Array Lens System. (2) MEMS-based freeform variable focusing Micromirror Array Lens System has a very fast variable speed. (3) the freeform variable focusing Micromirror Array Lens System as the type of reflective lenses allows the use of various resources as there are no restrictions on image display devices.

Although the present invention is briefly summarized, the full understanding of the invention can be obtained by the following drawings, detailed descriptions, and appended claims.

DESCRIPTION OF FIGURES

These and other features, aspects and advantages of the present invention will become better understood with reference to the accompanying drawings, wherein.

DETAILED DESCRIPTION OF THE ILLUSTRATED EMBODIMENTS

Figure 1:
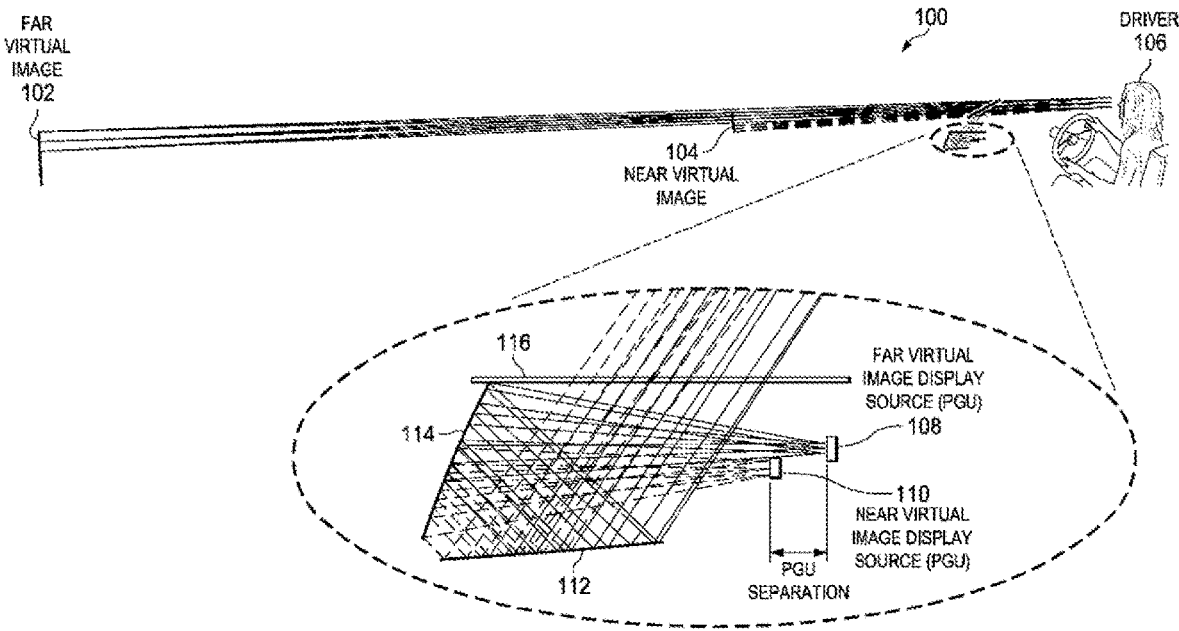
FIG. 1 illustrates a multi-focus heads-up display system utilizing multiple picture generator units. (PRIOR ART)

FIG. 1 illustrates prior inventions and general HUD systems. The virtual image generated by the Picture Generator Unit (PGU) projects through a set of optical modules, such as mirrors and lenses, and the driver sees the virtual image in front of his eyes. In FIG. 1, the virtual images can be divided into two areas to show images both near distances and far distances. In previous inventions, a similar study was conducted according to the focal length, and one had to be satisfied with showing two virtual images (near distance and far distance) as shown in FIG. 1.

Figure 2A:
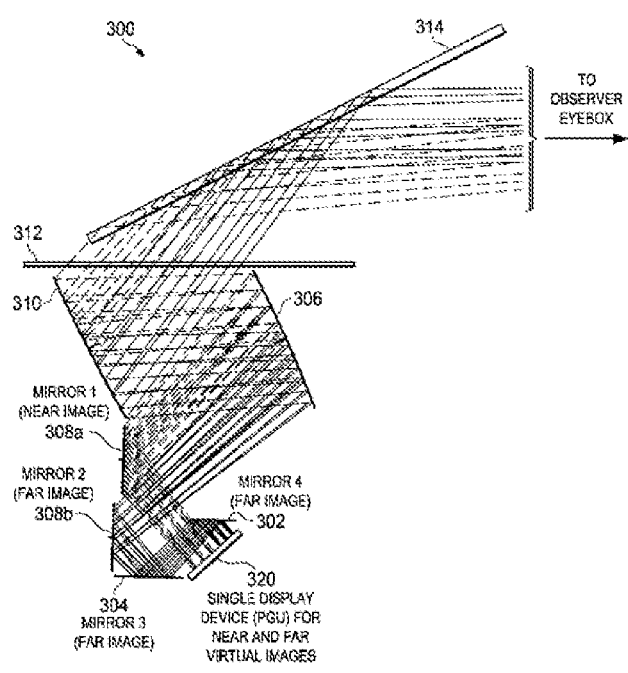
FIGS. 2A and 2B illustrate a system modified to provide a virtual image distance difference adjustment capability. (PRIOR ART)
Figure 2B:
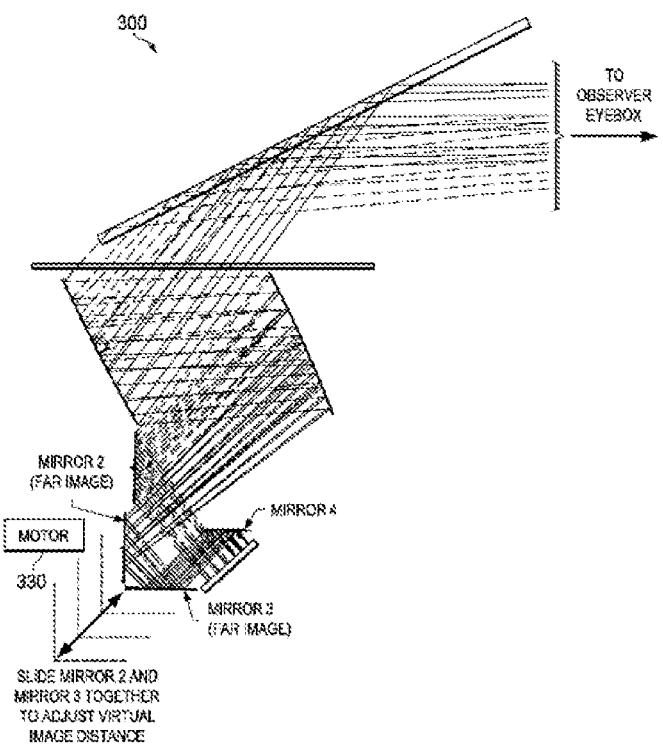

FIG. 2 shows example inventions to secure two focal lengths, referred to U.S. Pat. No. 9,291,819 B2 to Ferri. FIG. 2A was conducted by simply dividing into two areas by using one display and two mirrors. In FIG. 2B, two mirrors were combined to adjust the focal length of the virtual image, and the volume increased and the variable velocity of the focal length was limited depending on the driving method. In present invention, the freeform variable focusing Micromirror Array Lens System is used to implement multi-focus distances beyond these limits and to enable high-speed adjustment of multi-focus distances by securing variable speeds applicable to the AR-HUD.

Figure 3:
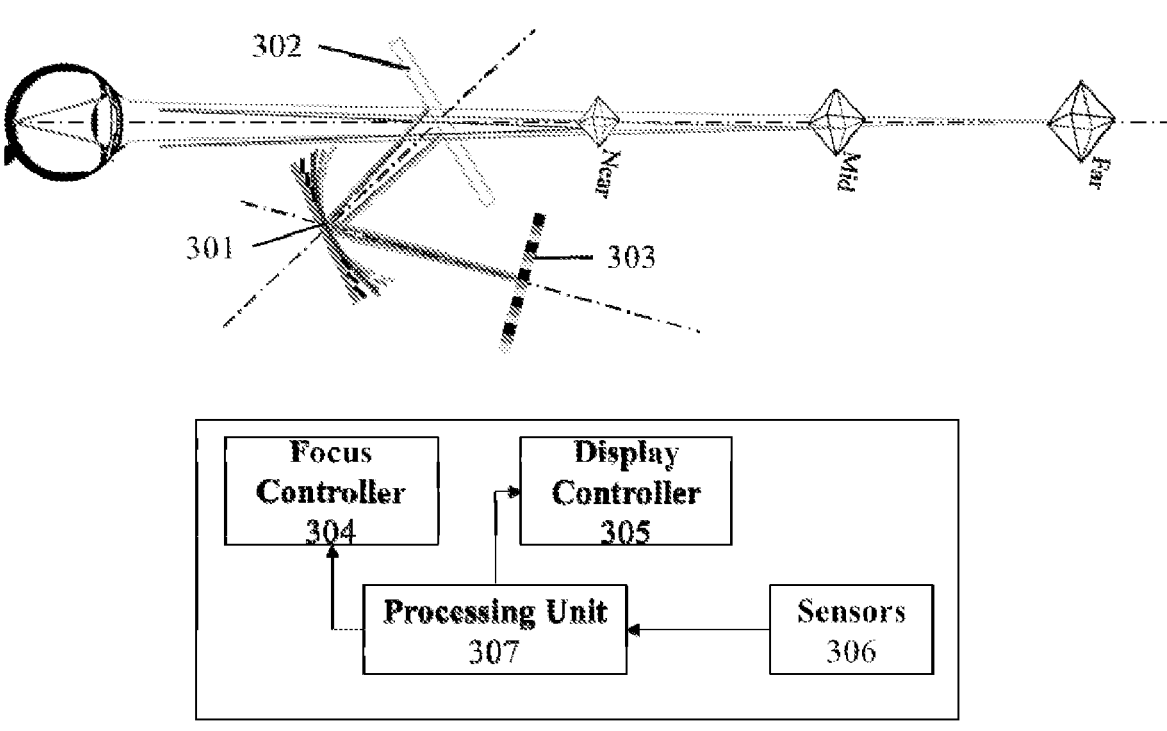
FIG. 3 show the configuration of freeform variable focusing Micromirror Array Lens System for AR-HUD.

FIG. 3 show the configuration of the AR-HUD based on the freeform variable focusing Micromirror Array Lens System. In present invention, the AR-HUD is composed of the freeform variable focusing Micromirror Array Lens System, focus controller, display unit, display controller, optics module and processing unit.

The freeform variable focusing Micromirror Array Lens system 301 reflects the virtual image transmitted from display unit 303 by adjusting the focal length to the windshield or beam splitter 302. At this time, the freeform variable focusing Micromirror Array Lens system 301 may vary the focal length of the virtual image according to the target to be displayed. Since the freeform variable focusing Micromirror Array Lens system can be transformed into a lens for various focal lengths, it can be displayed with various focal lengths as well as the positions of Near, Mid, and Far shown in FIG. 3. The windshield or beam splitter 302 is an area visible to the driver by overlapping the virtual image with the real external environment. Display unit 303 outputs the virtual image generated by the processing unit.

When information such as the speed of the vehicle, the distance to the object, etc. is transmitted to the processing unit 307 through the sensor 306, the processing unit 307 analyzes the object and predicts the distance, and generates the information about the object. The processing unit 307 sets the position of the virtual image considering the generated information. The processing unit 307 creates the virtual image to be shown to the driver and transmits it to the display controller 305. The display unit 303 adjusts the received virtual image to be clearly displayed to the driver by the display controller 305 and displays the virtual image. The virtual image that reaches the freeform variable focusing Micromirror Array Lens System through the optical path requires focus adjustment by the focus controller 304. The focus controller 304 synchronizes with the display controller 305 to operate the freeform variable focusing Micromirror Array Lens System and adjusts the focus length.

Figure 4:
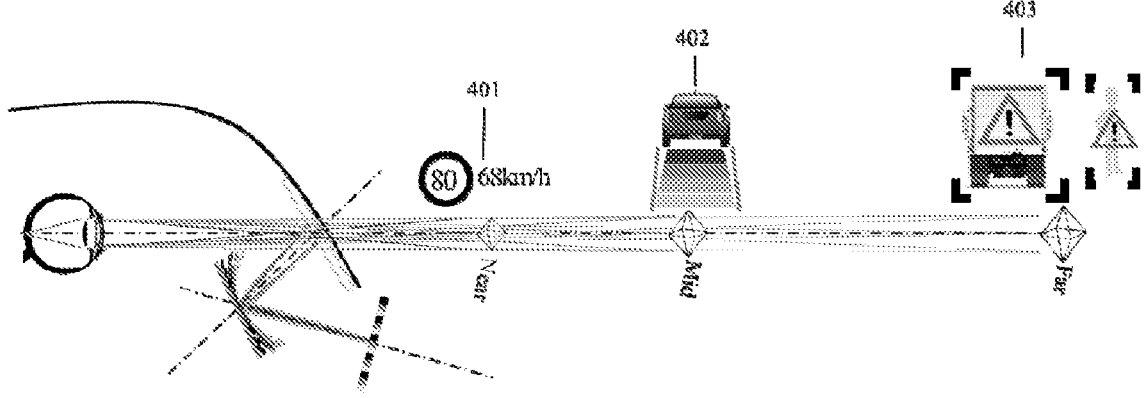
FIG. 4 show an example of AR-HUD based on a freeform variable focusing Micromirror Array Lens System.

FIG. 4 shows an example of the application of the AR-HUD based on a freeform variable focusing Micromirror Array Lens System. Depending on the multi-focus distance, the nearest distance 401 displays information about vehicle speed, vehicle condition information, road information, digital navigation information, and the corresponding distance objects. The middle distance 402 displays graphic navigation information such as vehicle distance and lane keeping and information on the corresponding distance object and the far distance 403 displays information about the objects such as a pedestrian, road, warning points, etc. and information on the corresponding distance object.

The information shown according to the movement of the vehicle is updated in real-time. The freeform variable focusing Micromirror Array Lens System reacts at high speed and controls the virtual image to be displayed at various focal lengths according to the change of focal length. The virtual image minimizes the dispersion of the driver's gaze due to excessive information by extracting only information useful to the driver according to the distance.

Figure 5A:
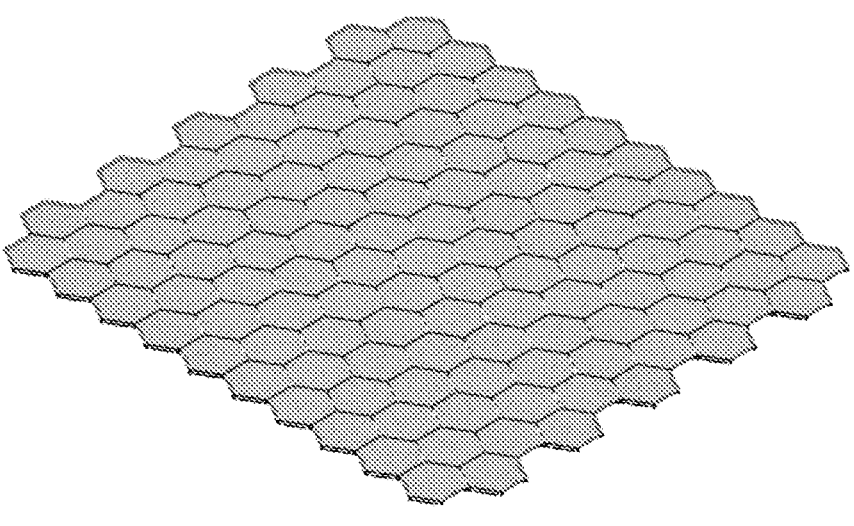
FIGS. 5A, 5B, 5C and 5D shows the example of freeform variable focusing elements

FIG. 5A shows the example of freeform variable focusing elements. Unlike ultra-high-speed variable focus elements, the freeform variable focusing elements are not circular symmetrical, and the shape of the micromirror is also square or hexagonal, not circular sector or trapezoidal. The freeform variable focusing elements can individually control thousands of micromirrors, they can implement so any lens shape, and an optical system in a form capable of reflective off-axis incident can be constructed. These elements are made by the MEMS process, so they can operate at low power and ultra-speed.

Figure 5B:
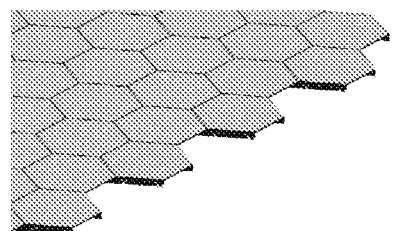
Figure 5C:
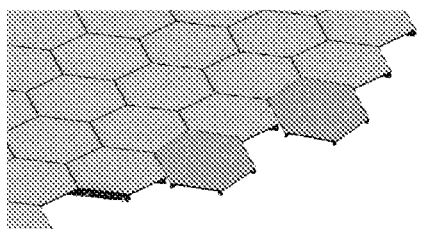
Figure 5D:

FIGS. 5B, 5C and 5D show examples of control modes. FIG. 5B shows a float mode. The float mode refers to an initial mode. In the initial mode, a flat mirror maintains a flat shape. FIG. 5C is a rotation mode, and FIG. 5D is a translation mode. The desired focal length and tilt can be created by adjusting each micromirror in the freeform variable focusing Micromirror Array Lens system.

Figure 6A:
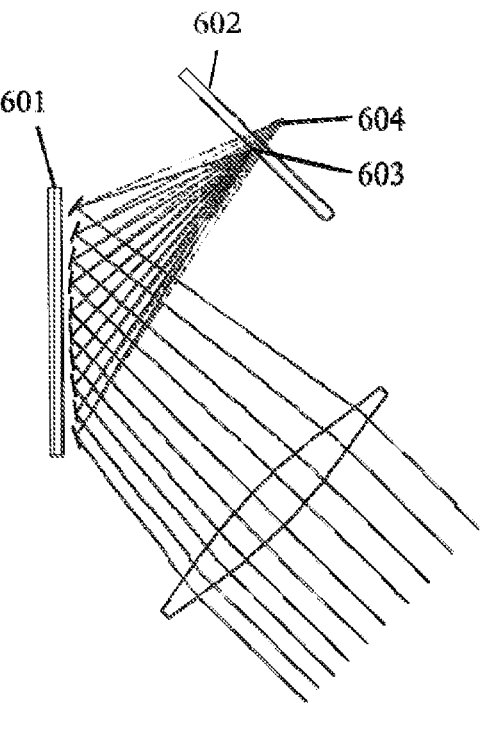
FIGS. 6A and 6B illustrate freeform curvature and focus length changes.
Figure 6B:
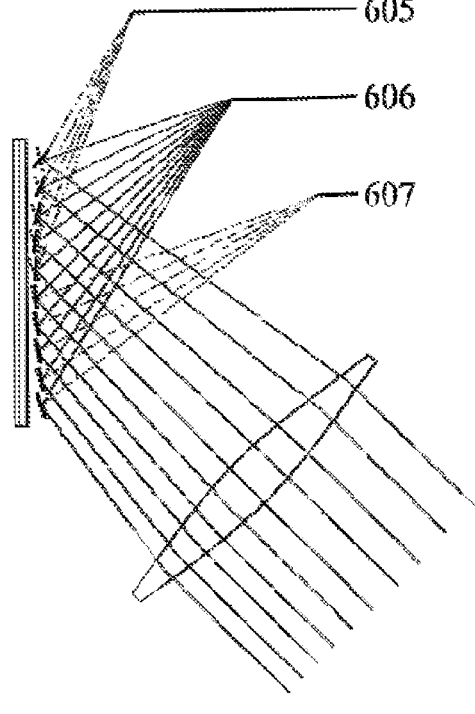

FIGS. 6A and 6B shows properties of the freeform variable focusing Micromirror Array Lens System, such as focus and optical axis changes. Because the micromirrors that make up the freeform surface are driven individually and can generate curvature through individual movements, the freeform surface changes the curvature from flat to curved, changing the focal length from near distance to far distance. These various movements correspond to AR-HUDs that need to adjust focal lengths more than 1,000 times per second (over 1 kHz) to create virtual images and deliver them to the driver.

The general properties of the Micromirror Array Lens are disclosed in U.S. Pat. No. 7,173,653 issued Feb. 6, 2007 to Gim, U.S. Pat. No. 7,215,882 issued May 8, 2007 to Cho, U.S. Pat. No. 7,354,167 issued Apr. 8, 2008 to Cho, U.S. Pat. No. 9,565,340 issued Feb. 7, 2017 to Seo, U.S. Pat. No. 7,236,289 issued Jun. 26, 2007 to Baek, U.S. Pat. No. 9,736,346 issued Aug. 15, 2017 to Baek, all of which are incorporated herein by references.

The general principle, methods for making the micromirror array devices and Micromirror Array Lens, and their applications are disclosed in U.S. Pat. No. 7,057,826 issued Jun. 6, 2006 to Cho, U.S. Pat. No. 7,339,746 issued Mar. 4, 2008 to Kim, U.S. Pat. No. 7,077,523 issued Jul. 18, 2006 to Seo, U.S. Pat. No. 7,068,416 issued Jun. 27, 2006 to Gim, U.S. Pat. No. 7,333,260 issued Feb. 19, 2008 to Cho, U.S. Pat. No. 7,315,503 issued Jan. 1, 2008 to Cho, U.S. Pat. No. 7,768,571 issued Aug. 3, 2010 to Kim, U.S. Pat. No. 7,261,417 issued Aug. 28, 2007 to Cho, U.S. Pat. Pub. No. 2006/0203117 A1 published Sep. 14, 2006 to Seo, U.S. Pat. Pub. No. 2007/0041077 A1 published Feb. 22, 2007 to Seo, U.S. Pat. Pub. No. 2007/0040924 A1 published Feb. 22, 2007 to Cho, U.S. Pat. No. 7,742,232 issued Jun. 22, 2010 to Cho, U.S. Pat. No. 8,049,776 issued Nov. 1, 2011 to Cho, U.S. Pat. No. 7,350,922 issued Apr. 1, 2008 to Seo, U.S. Pat. No. 7,605,988 issued Oct. 20, 2009 to Sohn, U.S. Pat. No. 7,589,916 issued Sep. 15, 2009 to Kim, U.S. Pat. Pub. No. 2009/0185067 A1 published Jul. 23, 2009 to Cho, U.S. Pat. No. 7,605,989 issued Oct. 20, 2009 to Sohn, U.S. Pat. No. 8,345,146 issued Jan. 1, 2013 to Cho, U.S. Pat. No. 8,687, 276 issued Apr. 1, 2014 to Cho, U.S. Pat. Pub. No. 2018/ 064562 A1 published Jun. 14, 2018 to Byeon, U.S. Pat. Pub. No. 2019/0149795 A1 published May 16, 2019 to Sohn, U.S. Pat. Pub. No. 2019/0149804 A1 published May 16, 2019 to Sohn, U.S. Pat. Pub. No. 2020/0341260 A1 published Oct. 29, 2020 to Gaiduk, U.S. Pat. No. 11,378,793 issued Jul. 5, 2022 to Winterot, U.S. Pat. Pub. No. 2021/ 0132356 A1 published May 6, 2021 to Gaiduk, all of which are incorporated herein by references.

The virtual image received by the display unit is reflected on the freeform variable focusing Micromirror Array Lens Systems 601 and projects on flat object 602 and changed its focus. At this time, the freeform variable focusing Micromirror Array Lens Systems 601 changes the shape for an accurate focal length of the virtual image. If the focal length is adjusted to the flat object 602, it indicates focal length area 603 and the far focal length indicates focal length area 604 through the flat object. An example of a shape change for distance adjustment relative to the coaxial is FIG. 6A. FIG. 6B is an example of changing the focal length to an angle other than coaxial. The focal length area 606 can be shift with optical axis change by the freeform variable focusing Micromirror Array Lens Systems into tilted positions of focal length area 605 and focal length area 607. The freeform variable focusing Micromirror Array Lens Systems 601 used in the present invention can change the angle of the optical axis as well as the focal length.

Figure 7A:
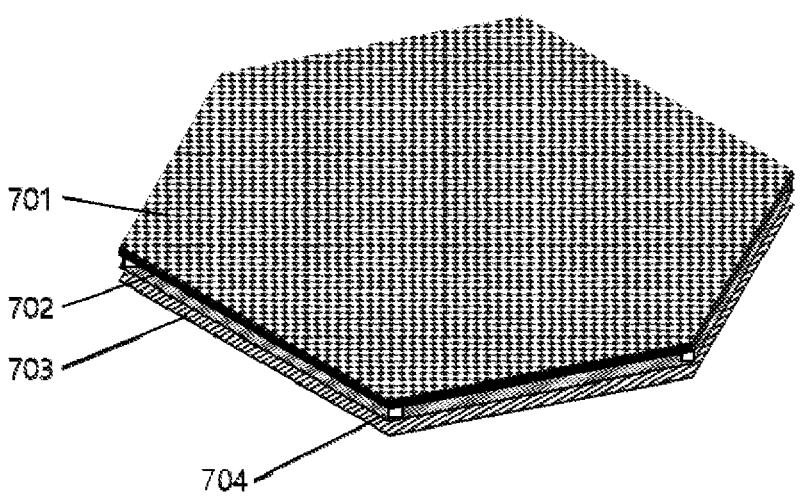
FIGS. 7A, 7B, 7C and 7D show the micromirror and actuator that formed the freeform surface.
Figure 7B:
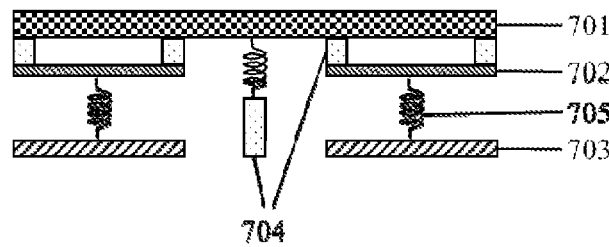
Figure 7C:
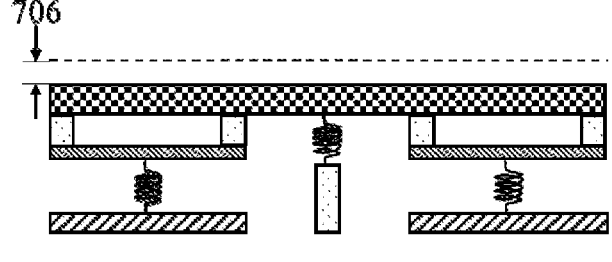
Figure 7D:
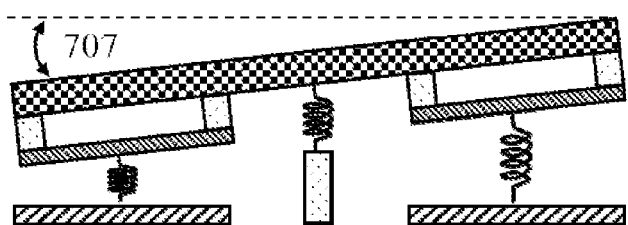

FIGS. 7A, 7B, 7C and 7D show the micromirror and the actuator that formed the freeform surface. As shown in FIG. 7A, Micromirror consists of mirror segments 701, actuator layer 702, electrode layer 703, and mirror post (anchor) 704. The actuator is actuator layer 702 and spring 705. In FIG. 7B, the actuator (702 and 705) connected to mirror segment 701 with actuator layer 702, so the movement of the actuator can adjust the motion of micromirror. The actuator can be controlled by the voltages applied to the electrodes and the micromirror has three degrees of freedom motion with at least 3 independently tunable actuators. Translational movements of three separate actuators can implement piston, tip, and tilt motions of Micromirror. As shown in FIG. 7C, the same movement is caused in the three, so it is possible to move as much as moving distance 706. In FIG. 7D, three actuators can tilt the micromirror as much as angle 707 by applying different voltages using the second or third order function and a lookup table.

The general principle, structure and methods for making the discrete motion control of MEMS device are disclosed in U.S. Pat. No. 7,330,297 issued Feb. 12, 2008 to Noh, U.S. Pat. No. 7,365,899 issued Apr. 29, 2008 to Gim, U.S. Pat. No. 7,382,516 issued Jun. 3, 2008 to Seo, U.S. Pat. No. 7,400,437 issued Jul. 15, 2008 to Cho, U.S. Pat. No. 7,411,718 issued Aug. 12, 2008 to Cho, U.S. Pat. No. 7,474,454 issued Jan. 6, 2009 to Seo, U.S. Pat. No. 7,488, 082 issued Feb. 10, 2009 to Kim, U.S. Pat. No. 7,535,618 issued May 19, 2009 to Kim, U.S. Pat. No. 7,898,144 issued Mar. 1, 2011 to Seo, U.S. Pat. No. 7,777,959 issued Aug. 17, 2010 to Sohn, U.S. Pat. No. 7,589,884 issued Sep. 15, 2009 to Sohn, 2006, U.S. Pat. No. 7,589,885 issued Sep. 15, 2009 to Sohn, U.S. Pat. No. 7,605,964 issued Oct. 20, 2009 to Gim, and U.S. Pat. No. 9,505,606 issued Nov. 29, 2016 to Sohn, all of which are incorporated herein by references.

Figure 8:
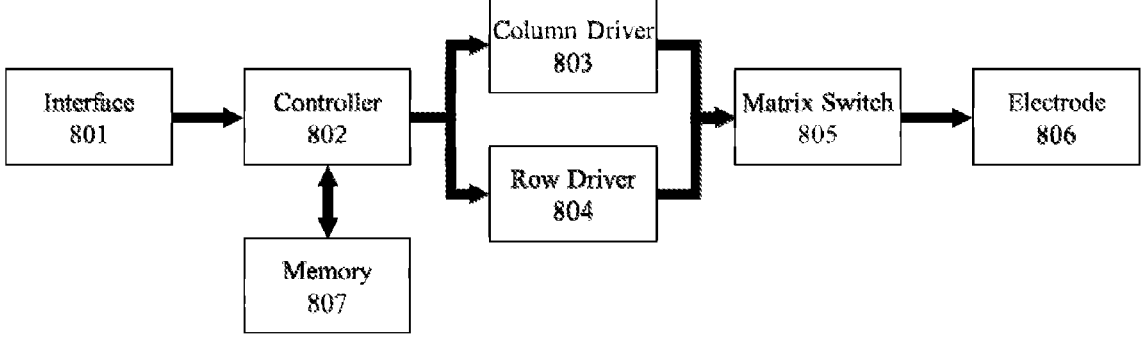
FIG. 8 shows an example of a focus controller.

FIG. 8 shows an example of focus controller. The focus controller consists of interface 801, controller 802, column drivers 803, row drivers 804, matrix switch 805, electrode 806 and internal memory 807. The interface 801 transmits data and control signals input from the outside to the controller 802. The controller 802 stores external data received through the interface 801 in memory 807 and sends it to the column driver 803. It also controls the sequence of column drivers 803 and row drivers 804. The column driver 803 contains as many DACs (Digital-to-Analog Converter) as the number of columns in the matrix switch 805 and converts digital data received from the controller 802 into analog data through the DAC. The row driver 804 controls on/off of the matrix switch 805 connected to each row. The switch is turned on at regular intervals and the voltage supplied from the DAC of the column driver 803 is sent to the electrode 806. The matrix switch 805 is composed of FETs (Field Effect Transistor) and controls analog output by linking signals supplied from the DAC of the column driver 803 to on/off of the row driver 804. The memory 807 stores external data received from the controller 802. The electrode 806 transmits the analog voltage output through the matrix switch to the actuator device.

Focus parameters received from the processing unit are stored in memory 807 through the interface 801. At this point, the controller 802 synchronizes with the display controller and transmits the control signal of the micromirror stored in the memory to the driver 803 and 804. The micromirror may set the posture with 3 degrees of freedom according to the supplied voltage. The freeform variable focusing Micromirror Array Lens System is implemented as CMOS ASIC (Complementary Metal-Oxide-Semiconductor Application-Specific Integrated Circuit).

Display unit can include a display panel and a BLU (backlight unit). The display panel can display the AR-HUD images, and the BLU can provide light for the AR-HUD images to the display panel. The display unit can be composed of components such as LCD (Liquid Crystal Display), LCOS (Liquid Crystal on Silicon), DMD (Digital Micromirror Device), OLEDOS (Organic Light Emitting Diode On Silicon), and LEDOS (Light-Emitting Diode On Silicon).

If the display unit is LCD, BLU and fan are required. The LCD consists of a liquid crystal, a color filter, a polarizer, and the arrangement of the liquid crystal changes as the electrodes are switched on or off, and a color image is displayed when the amount of light from the BLU passes through the liquid crystal and the color filter. The BLU consists of LEDs and diffusing plates, with the same area of LCD size placed in white LEDs for high-brightness light. The heat dissipation fan is placed behind the BLU to reduce the heat generation of the high-brightness LED.

BLU has a direct lighting method and an edge lighting method depending on the backlight method. In the case of the direct lighting method, the amount of light according to the direct lighting is high, but a lot of space is required in the thickness direction. The AR-HUD requires high luminance because it should be visible even during the bright day. Typical OLEDs require higher luminance at 500-1000 nit levels and may require a design suitable for them. Therefore, direct lighting may be more advantageous than edge lighting and space consideration may be required.

AR virtual images can be provided in a projection type, which is a conventional HUD method, so that AR virtual images are provided without obstacles in the driver's line of sight. The projection type is a method of projecting virtual image display on a screen, requiring a display unit that provides HUD virtual images and a screen onto which HUD virtual images are projected. The screen can be made of various materials, including a vehicle's windshield.

Figure 9:
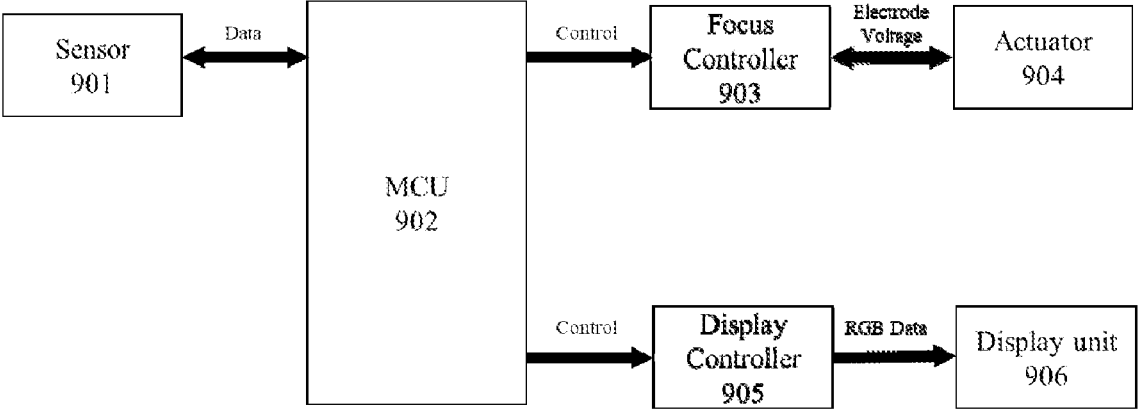
FIG. 9 shows an example of a display controller.

FIG. 9 shows an example of a display controller used in the AR-HUD. The display controller adjusts the virtual image area of the AR-HUD to be visible to the virtual image area formed on the front or front of the vehicle and transmitted to the driver's eyes. The display controller is responsible for outputting and adjusting virtual images.

The sensor 901 detects the environments around the car, including LiDAR (Light Detection And Range), RADAR (Radio Detection And Range), camera, and ultrasonic sensor, and displays the virtual image based on the data output from the sensor. The Main Control Unit (MCU) 902 oversees all controls, including information display, actuator change, and display position change, using sensor data. The focus controller 903 controls the operation of the actuator 904 to change the focus length of the optical system. The actuator 904 changes the position of display information through individual micromirror movements. The display controller 905 controls the delivery and display of information to be displayed based on the data received from the MCU 902. The display unit 906 can be composed of LCD, LCOS, OLEDOS, LEDOS, DLP, etc., and displays information under the control of the display controller 905.

Display controller adjusts and displays the virtual images and control signals received from the processing unit. The display speed of the image shall be adjusted according to the distance between the vehicle and the object, or the variable error of the distance between the vehicle and the object according to the speed of the vehicle. If necessary, it is also necessary to match the position of the driver's eyes with the virtual image.

HUD is a device that reflects an image on a windshield or transparent plate to provide vehicle information and route information such as vehicle speed, RPM, and mileage to the driver and the area where the image containing the information to be transmitted to the driver is displayed, FOV (Field of View) is very important.

In order to provide AR-level information through the AR-HUD, the virtual image area where the AR-HUD video is observed needs to be implemented with a wide FOV. If the displayed image is not large enough or the FOV is not wide enough, it may be difficult to express information about objects or backgrounds in front of the vehicle in AR. The optics module including the display unit can be mounted in the dashboard of the vehicle. However, the space in the dashboard is limited, so there may be limitations in implementing a sufficient wide FOV. LED arrays are used as light sources and is a source of heat. The heat may be generated depending on the volume and layout of the optics module, and power consumption issues may occur depending on the size of the image. In the AR-HUDs, the wider FOV is required than in general HUDs, so there may be brightness issues with the traditional design method.

The AR-HUD provides the virtual image provided by the display unit to be viewed from the driver's perspective through the optics module. The optics module composed of the freeform variable focusing Micromirror Array Lens system, lens, and mirror. By adjusting the mirror, it is possible to set the basic area of the virtual image and adjust it to suit the driver's condition. It is possible to adjust according to the driver's posture, such as high and low and left and right tilt. Additional optics module extensions also allow the virtual images to be delivered to the passenger's seat.

Figure 10A:
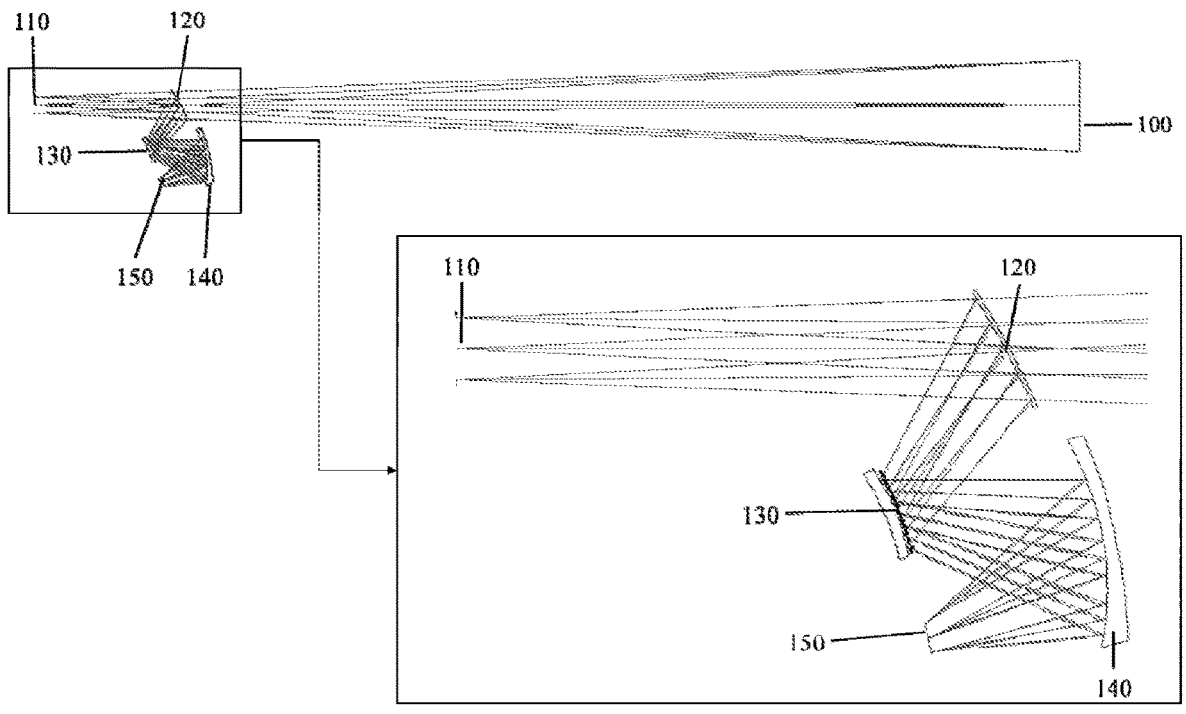
FIGS. 10A and 10B shows an example of an optics module.
Figure 10B:
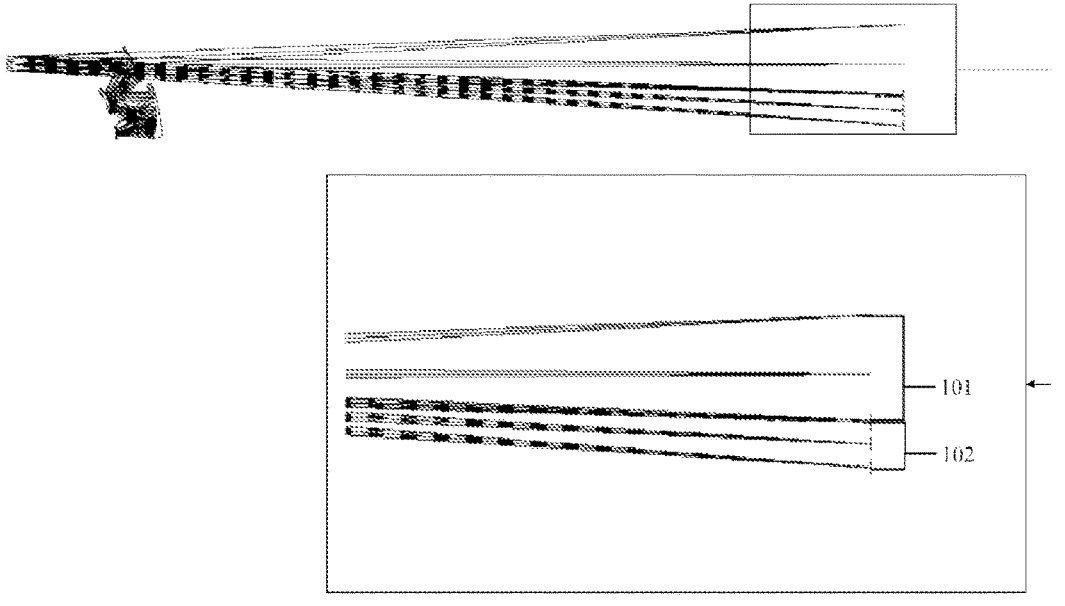

FIGS. 10A and 10B shows an example of optics module for the AR-HUD. In FIG. 10A, FOV 100 is the area recognized by the driver. The virtual image output from display unit 150 is reflected from the folding mirror 140 and is adjusted to the focal length adjusted according to the object in the freeform variable focusing Micromirror Array Lens System 130 and projected onto the windshield or combiner 120. In eye box 110 of the driver, the virtual image projected on the windshield or combiner 120 is viewed, and the driver recognizes that it is located in FOV 100. The freeform variable focusing Micromirror Array Lens System 130 can change the position of the FOV 100 as it continuously changes the focal length. Compared to a single FOV in the existing HUD, the freeform variable focusing Micromirror Array Lens System 130 can be used to position the FOV at various focal lengths and show it to the driver.

FIG. 10B is an example of this development for the extension of the FOV 100. The FOV 101 recognized by the driver through the optical module can be changed to FOV 102 by adjusting the freeform variable focusing Micromirror Array Lens System 130. Therefore, in this invention, it is possible to move and expand the FOV up and down with the function of the freeform variable focusing Micromirror Array Lens System 130. The range of expansion and movement can be determined by the performance of the processing unit, focusing controller, and display controller. This performance is possible because of the accuracy, repeatability, and fast response speed, which are characteristics of the freeform variable focusing Micromirror Array Lens System 130.

Figure 11:
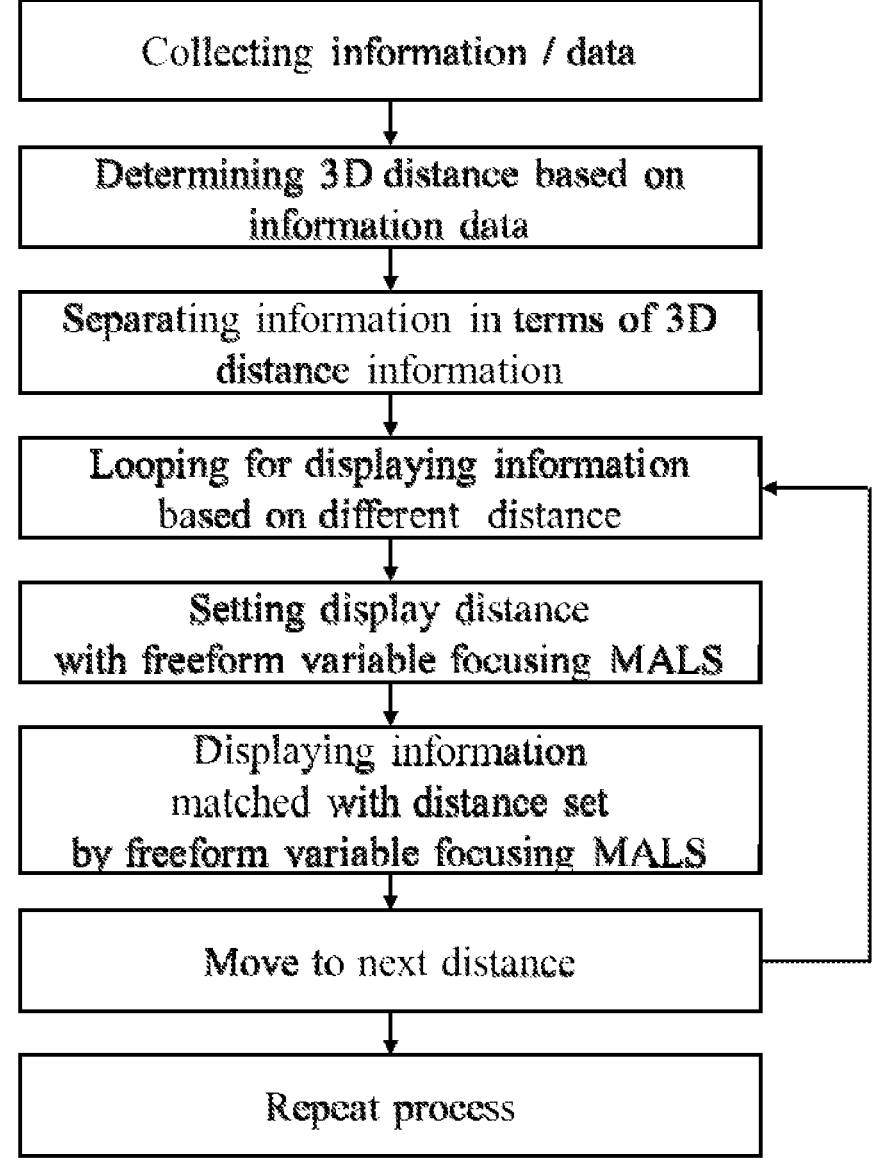
FIG. 11 shows a block diagram of flow data and processing.

FIG. 11 shows a block diagram of flow data and processing. The processing unit collects information and data needed to create a virtual image while driving and select information that needs to be displayed from the collected information and determine the distance to the 3D object based on the selected information. Based on the determined 3D distance information, collected information is separated into groups in terms of 3D distance information as focal length information of the freeform variable focusing Micromirror Array Lens System. 3D distance information is the basis for AR information displayed as a virtual image and the freeform variable focusing Micromirror Array Lens System adjusting the focal length to match the 3D distance.

For displaying information based on different distances, looping for displaying information based on different distances is crucial. For this looping, first display distance is set through setting the focal length of the freeform variable focusing Micromirror Array Lens System. And the display unit displays display information matched with distance set by the freeform variable focusing Micromirror Array Lens System. Thus while looping the different distances, display information is displayed according to the 3D distance information and thus focal length of the freeform variable focusing Micromirror Array Lens System. Display information with respect to the different distances help driver for easier recognition of the information since driver does not need to change his/her focus of the eyes.

Displaying multiple objects with different distances is performed through looping for displaying information based on different distances. Then whole on frame of information can be displayed with different distances is done. Then the process is repeated through from collecting information, determining 3D distances based on information data, separating information in terms of 3D distance information, and looping for displaying information based on different distances.

Figure 12:
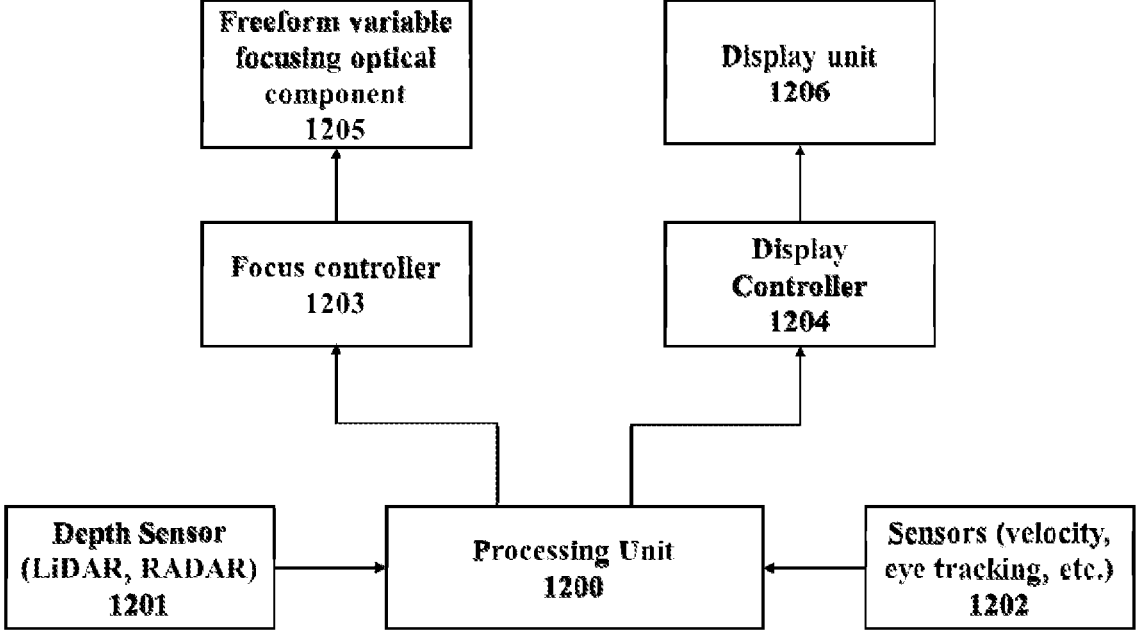
FIG. 12 shows a block diagram of the AR-HUD according to an embodiment of the present invention.

FIG. 12 shows a block diagram of the AR-HUD according to an embodiment of the present invention. The AR-HUD can be implemented with hardware components and software components. The hardware components include the optics module with the freeform variable focusing Micromirror Array Lens System 1205, focus controller 1203, display unit 1206, display controller 1204 and processing unit 1200. The focus controller, display controller, and processing unit also have the software components.

The processing unit 1200 generates virtual images to be displayed to the driver and proceeds with the operation of the two controllers (focus controller 1203 and display controller 1204). The processing unit 1200 is a device that can execute and respond to commands, such as CPU (Central Processing Unit), GPU (Graphics Processing Unit), DPU (Data Processing Unit), FPGA (Field Programmable Gate Array), and PLU (Programmable Logic Unit). It can use a computer installed in the car or an additional device.

The processing unit 1200 used installed sensors (1201 and 1202) such as LiDAR, RADAR, and Eye tracking in the car and the information provided to the car. The basic distance of objects can be acquired from LiDAR, RADAR, and depth sensors. The position of the driver's gaze can be taken from the eye-tracking sensor as needed.

Various information is converted from a processing unit to a virtual image to be shown to the AR-HUD and calculates the motion parameters to be passed on to each controller. The virtual images shown to drivers are various objects that are seen while driving and are created in accordance with the object's focal length in the location of objects such as vehicles, roads, pedestrians, streets, and buildings. The processing unit delivers the generated virtual image to the display unit and synchronizes it so that the freeform variable focusing Micromirror Array Lens System can operate.

The present invention of head up display (HUD) system with displaying multiple planes controlled by freeform variable focusing Micromirror Array Lens System comprises a freeform variable focusing Micromirror Array Lens System, a focus controller for controlling the freeform variable focusing Micromirror Array Lens System, a display unit wherein the display unit displays two dimensional images with information with time, an optical module wherein the optical module relays the two dimensional images displayed by the display unit, and a display unit controller wherein the display unit controller gives signal to the display unit with time correlated with the focus controller synchronized with the freeform optical surface profiles and the two dimensional images The freeform variable focusing Micromirror Array Lens is a MEMS (Micro-Electro-Mechanical System) technology based device and comprises a plurality of micromirrors. The micromirrors in the freeform variable focusing Micromirror Array Lens have three degrees of freedom motion and are independently controlled to form freeform optical surface profiles. The freeform optical surface profiles are formed with the micromirrors in the freeform variable focusing Micromirror Array Lens System. Each micromirror is controlled for satisfying the convergence condition and the phase matching conditions of the Micromirror Array Lens System. Each optical surface profile act as a lens surface for changing focal length of the optical system.

The optical module relays the two dimensional images displayed by the display unit. The optical module changes display distance of the module and changes the relaying display surfaces of the display unit by changing the freeform optical surface profiles. The optical module provides images to human eyes with varying distance of the relaying display surfaces and varying distance of the relaying display surfaces is obtained through the freeform variable focusing Micromirror Array Lens System.

The display unit controller gives signal to the display unit with time correlation together with the focus controller synchronized with the freeform optical surface profiles of the freeform variable focusing Micromirror Array Lens System. The freeform variable focusing Micromirror Array Lens System varies distances of the relaying display surfaces of the two dimensional images by changing the freeform optical surface profiles by controlling the voltages of the focus controller.

In the present invention of the head up display system with displaying multiple planes controlled by freeform variable focusing Micromirror Array Lens System, the focus controller and the freeform variable focusing Micromirror Array Lens System is fabricated together in wafer level and packaged. And the freeform variable focusing Micromirror Array Lens System is fabricated with structures of independently controllable micromirrors and the individual micromirrors have independently control for multi-degree of freedom motions in the Micromirror Array Lens System.

The focus controller makes a plurality of voltages to control freeform variable focusing Micromirror Array Lens System. The focus controller makes a plurality of voltages to form the freeform optical surface profiles. The freeform optical surface profiles are determined by pre-determined sets of control voltages. The focus controller is synchronized with the display unit for displaying information from the display unit to the multiple display planes. The head up display (HUD) with displaying multiple planes controlled by freeform variable focusing Micromirror Array Lens System further comprises distance sensor for determining display planes. And the optical module further comprises focus offset adjustment means.

The present invention of the head up display (HUD) system with displaying planes controlled by freeform variable focusing optical component with integrated control logic comprises a freeform variable focusing optical component, a focus controller for controlling the freeform variable focusing optical component, a display unit, an optical module A freeform variable focusing optical component wherein the freeform variable focusing optical component comprises plurality of optical elements with independently controllable multiple degrees of freedom, wherein the optical elements in the freeform variable focusing optical component form plurality of optical surface profiles wherein the optical profiles represent different focal lengths of the freeform variable focusing optical component, and a display unit controller.

The focus controller is integrated with the freeform variable focusing optical component. The focus controller can change the control voltages of the freeform variable focusing optical component and changes the freeform optical surface profiles with time.

The display unit displays two dimensional images with information with time. The display unit is synchronized with the focus controller. Thus, each images can be displayed with different display distance by the change of the optical surface profiles of the freeform variable focusing component.

The optical module relays the two dimensional images displayed by the display unit. The optical module makes basic construction of the optical system in the AR-HUD system. The freeform variable focusing optical component changes display distances of the optical module by changing the freeform optical surface profiles. The optical module should be design to maximize the effect of the freeform variable focusing optical component. The optical module provides images from the display unit to human eyes with varying display distances of the display unit.

The display unit controller gives signal to the display unit with time correlation of the focus controller. Without synchronization information cannot be displayed at desired display planes. Thus correlation between the display unit and the focus controller is crucial. The freeform variable focusing optical component is built by MOEMS (Micro-Opto-Electro-Mechanical System) technology and the focus controller for controlling the freeform variable focusing optical component is built with integrated control logic.

The freeform variable focusing component and the focus controller for controlling the freeform variable focusing optical component are fabricated separately and combined together with wafer level bonding technology and packaged together for usage.

The individual optical elements in the freeform variable focusing optical component are controlled by electro-static force induced by the control voltages from the focus controller and mechanical structures of the individual optical elements in the freeform variable focusing optical component. The freeform variable focusing optical component is fabricated with independently controllable structures and the independent controllable structures are controlled by the focus controller independently.

The focus controller makes a plurality of voltages to control the plurality of the optical elements in the freeform variable focusing optical component independently. The focus controller makes a plurality of voltages to form the freeform optical surface profiles. The freeform optical surface profiles are determined by predetermined sets of control voltages and stored together with the focus controller. The freeform optical surface profiles are determined to have plurality of display distances and optical axis changes of the optical module.

For the present invention, there is an order of operation for properly operating the AR-HUD system with the freeform variable focusing component. Controlling method for head up display with varying display planes controlled by freeform variable focusing optical component comprises steps of collecting information and data, determining display distances based on the information and the data given, separating the information in terms of distances, looping for displaying information based on different display distances, and repeating steps of collecting, determining, separating, and looping with the display distances.

Information such as vehicle speed, vehicle condition information, road information, digital navigation and corresponding distance object are collected as information. And data such as distance data of objects in sight, driver condition, images and data for further calculation of the display distance are collected as data for the AR-HUD system.

Based on the information and the data collected in the previous step, the display distances are categorized based upon the data and information should be matched with the display distances also.

To display information at desired display distances, separating the information in terms of distances is necessary. To simplify the operation, grouping these information is a better way to avoid complexity of the system. It is highly desirable to make groups of data with the same display distances at decent number of display distances.

To display multiple information at desired display distances, looping is a simple way for displaying information based on display distance. At first setting the display distance for the information with the freeform variable focusing optical component. For this step, the freeform variable focusing optical component changes its focus to determine the display distance of the AR-HUD system. Secondly displaying information matched with the display distance set by the freeform variable focusing optical component. For time effectiveness, process can be systematically aligned with time. And next loop with the next display distance can be performed. After looping, information for multiple display distance can be displayed with different display distances. This one loop information is for one frame data for the driver including distance. This loop can be performed very fast with the freeform variable focusing optical component so that the driver cannot notice the discontinuity of the display.

Repeating steps of collecting, determining, separating, and looping with the display distances continues the information and data display for the driver. And separately, the processing unit can be used for controlling the display unit and the focus controller for optical module including the freeform variable focusing optical component. The freeform variable focusing optical component changes optical profiles to change the display distances by the processing unit and updated real-time.

The present invention of the head up display (HUD) system with displaying planes controlled by freeform variable focusing optical component with integrated control logic comprises of a freeform variable focusing optical component wherein the freeform variable focusing optical component comprises plurality of optical elements with independently controllable multiple degrees of freedom, wherein the optical elements in the freeform variable focusing optical component are controlled to have plurality of optical profiles.

The multiple optical profiles of the freeform variable focusing optical component satisfy the convergence and the phase matching conditions to have variable focusing lens properties. Also the freeform variable focusing optical component compensates optical aberration due to off-axis configuration of the optical module to relay the display plane to driver's eyes.

The plurality of optical surface profiles represents different corresponding focal lengths of the freeform variable focusing optical component individually. The focus controller for controlling the freeform variable focusing optical component is integrated with the freeform variable focusing optical component.

The focus controller can change the control voltages of the freeform variable focusing optical component and changes the freeform optical surface profiles with time. Thus the freeform variable focusing optical component can change within very short time. Thanks to fast speed of the freeform variable focusing optical component, plurality of the display planes can be displayed within very short time such that the driver feels the images are displayed simultaneously.

The display unit wherein the display unit displays two dimensional images with information with time, which should be synchronized with focus controller of the freeform variable focusing optical component. The freeform variable focusing optical component can be a freeform variable focusing Micromirror Array Lens System.

The optical module relays the two dimensional images displayed by the display unit and the freeform variable focusing optical component changes display distances of the optical module by changing the freeform optical surface profiles. The optical module provides images to human eyes with varying display distances of the display unit, and the display unit controller gives signal to the display unit with time correlation of the focus controller.

The freeform variable focusing optical component is built by MOEMS technology and the focus controller for controlling the freeform variable focusing optical component is built with integrated control logic. The freeform variable focusing optical component and the focus controller are basically fabricated with semiconductor fabrication technology. Both the freeform variable focusing optical component and the focus controller are fabricated separately and combined together at the wafer level with wafer bonding technology. After wafer level bonding, bonded wafers are diced into single devices. With this techniques, large number of micromirrors in the freeform variable focusing optical component with multiple degrees of freedom can be controlled independently.

External control signal goes to the focus controller and the focus controller makes proper voltages for making predetermined optical profiles for the freeform variable focusing optical component. No direct electrical voltage controls to the freeform variable focusing optical component is needed for the freeform variable focusing optical component.

This work was supported by the Technology Innovation Program (20026046, Infinite focus variable multi AR HUD System) funded by the Ministry of Trade, Industry & Energy (MOTIE, Korea).

What is claimed is:

1. An AR-HUD (Augmented Reality-Head Up Display) system with displaying multiple planes controlled by freeform variable focusing Micromirror Array Lens System comprising:

a. a freeform variable focusing Micromirror Array Lens System wherein the freeform variable focusing Micromirror Array Lens System is a MEMS based device comprising a plurality of micromirrors wherein the micromirrors have three degrees of freedom motion and are independently controllable to form freeform optical surface profiles, wherein the freeform optical surface profiles are formed with the independently controlled micromirrors in the freeform variable focusing Micromirror Array Lens System;

b. a focus controller for controlling the freeform variable focusing Micromirror Array Lens System, wherein the focus controller gives control voltages to each of the micromirror in the freeform variable focusing Micromirror Array Lens System and wherein the focus controller can change the control voltages and changes the freeform optical surface profiles with time;

c. a display unit wherein the display unit displays two dimensional images with information with time;

d. an optical module wherein the optical module relays the two dimensional images displayed by the display unit wherein the optical module changes display distance of the module and changes the relaying display surfaces of the display unit by changing the freeform optical surface profiles and wherein the optical module provides images to human eyes with varying distance of the relaying display surfaces; and e. a display unit controller wherein the display unit controller gives signal to the display unit with time correlated with the focus controller synchronized with the freeform optical surface profiles and the two dimensional images;

wherein said freeform variable focusing Micromirror Array Lens System varies distances of the relaying display surfaces by the control voltages of the focus controller.

2. The AR-HUD system with displaying multiple planes controlled by freeform variable focusing Micromirror Array Lens System in claim 1, wherein the focus controller and the freeform variable focusing Micromirror Array Lens System is fabricated together in wafer level and packaged.

3. The AR-HUD system with displaying multiple planes controlled by freeform variable focusing Micromirror Array Lens System in claim 1, wherein the freeform variable focusing Micromirror Array Lens System is fabricated with structures of independently controllable micromirror motions in the Micromirror Array Lens System.

4. The AR-HUD system with displaying multiple planes controlled by freeform variable focusing Micromirror Array Lens System in claim 1, wherein the focus controller makes a plurality of voltages to control freeform Micromirror Array Lens System.

5. The AR-HUD system with displaying multiple planes controlled by freeform variable focusing Micromirror Array Lens System in claim 1, wherein the focus controller makes a plurality of voltages to form the freeform optical surface profiles.

6. The AR-HUD system with displaying multiple planes controlled by freeform variable focusing Micromirror Array Lens System in claim 5, wherein the freeform optical surface profiles are determined by pre-determined sets of control voltages.

7. The AR-HUD system with displaying multiple planes controlled by freeform variable focusing Micromirror Array Lens System in claim 1, wherein the focus controller is synchronized with the display unit for displaying information from the display unit to the multiple display planes.

8. The AR-HUD system with displaying multiple planes controlled by freeform variable focusing Micromirror Array Lens System in claim 1, wherein the AR-HUD with displaying multiple planes controlled by freeform variable focusing Micromirror Array Lens System further comprises distance sensor for determining display planes.

9. The AR-HUD system with displaying multiple planes controlled by freeform variable focusing Micromirror Array Lens System in claim 1, wherein the optical module further comprises focus offset adjustment means.

10. An AR-HUD (Augmented Reality-Head Up Display) system with displaying planes controlled by freeform variable focusing optical component with integrated control logic comprises of:

a. a freeform variable focusing optical component wherein the freeform variable focusing optical component comprises plurality of optical elements with independently controllable multiple degrees of freedom, wherein the optical elements in the freeform variable focusing optical component form plurality of optical surface profiles wherein the optical profiles represent different focal lengths of the freeform variable focusing optical component;

b. a focus controller for controlling the freeform variable focusing optical component wherein the focus controller is integrated with the freeform variable focusing optical component and wherein the focus controller can change the control voltages of the freeform variable focusing optical component and changes the freeform optical surface profiles with time;

c. a display unit wherein the display unit displays two dimensional images with information with time;

d. an optical module wherein the optical module relays the two dimensional images displayed by the display unit wherein the freeform variable focusing optical component changes display distances of the optical module by changing the freeform optical surface profiles and wherein the optical module provides images to human eyes with varying display distances of the display unit; and e. a display unit controller wherein the display unit controller gives signal to the display unit with time correlation of the focus controller;

wherein the freeform variable focusing optical component is built by MOEMS (micro-opto-electro-mechanical system) technology and the focus controller for controlling the freeform variable focusing optical component is built with integrated control logic.

11. The AR-HUD system with displaying planes controlled by freeform variable focusing optical component with integrated control logic in claim 10, wherein the freeform variable focusing component and the focus controller for controlling the freeform variable focusing optical component are fabricated separately and combined together with wafer level bonding technology and packaged together for usage.

12. The AR-HUD system with displaying planes controlled by freeform variable focusing optical component with integrated control logic in claim 10, wherein the individual optical elements in the freeform variable focusing optical component are controlled by electro-static force induced by the control voltages from the focus controller and mechanical structures of the individual optical elements in the freeform variable focusing optical component.

13. The AR-HUD system with displaying planes controlled by freeform variable focusing optical component with integrated control logic in claim 10, wherein the freeform variable focusing optical component is fabricated with independently controllable structures and the independent controllable structures are controlled by the focus controller independently.

14. The AR-HUD system with displaying planes controlled by freeform variable focusing optical component with integrated control logic in claim 10, wherein the focus controller makes a plurality of voltages to control the plurality of the optical elements in the freeform variable focusing optical component independently.

15. The AR-HUD system with displaying planes controlled by freeform variable focusing optical component with integrated control logic in claim 10, wherein the focus controller makes a plurality of voltages to form the freeform optical surface profiles.

16. The AR-HUD system with displaying planes controlled by freeform variable focusing optical component with integrated control logic in claim 15, wherein the freeform optical surface profiles are determined by predetermined sets of control voltages and stored together with the focus controller.

17. The AR-HUD system with displaying planes controlled by freeform variable focusing optical component with integrated control logic in claim 15, wherein the freeform optical surface profiles are determined to have plurality of display distances and optical axis changes of the optical module.

* * * * *